United States Patent
Destruel et al.

(10) Patent No.: US 12,527,752 B2
(45) Date of Patent: Jan. 20, 2026

(54) COMPOSITION BASED ON GELLAN GUM AND PHENYLEPHRINE, PRODUCTION METHOD AND USE AS AN OPHTHALMIC PRODUCT

(71) Applicant: UNITHER PHARMACEUTICALS, Amiens (FR)

(72) Inventors: Pierre-Louis Destruel, Carrieres-sur-Seine (FR); Vincent Boudy, Paris (FR); Ni Zeng, Orly (FR); Nathalie Mignet, Clamart (FR); Marc Maury, Saint Medard en Jalles (FR)

(73) Assignee: UNITHER PHARMACEUTICALS, Amiens (FR)

( * ) Notice: Subject to any disclaimer, the term of this patent is extended or adjusted under 35 U.S.C. 154(b) by 895 days.

(21) Appl. No.: 17/608,207

(22) PCT Filed: Apr. 30, 2020

(86) PCT No.: PCT/EP2020/061979
§ 371 (c)(1),
(2) Date: Nov. 2, 2021

(87) PCT Pub. No.: WO2020/221839
PCT Pub. Date: Nov. 5, 2020

(65) Prior Publication Data
US 2022/0211644 A1  Jul. 7, 2022

(30) Foreign Application Priority Data
May 2, 2019 (FR) .................. 1904602

(51) Int. Cl.
| | | |
|---|---|---|
| *A61K 31/137* | (2006.01) |
| *A61K 9/08* | (2006.01) |
| *A61K 47/36* | (2006.01) |
| *A61K 47/38* | (2006.01) |
| *A61P 27/08* | (2006.01) |

(52) U.S. Cl.
CPC .............. *A61K 31/137* (2013.01); *A61K 9/08* (2013.01); *A61K 47/36* (2013.01); *A61K 47/38* (2013.01); *A61P 27/08* (2018.01)

(58) Field of Classification Search
CPC ........ A61K 31/137; A61K 9/08; A61K 47/36; A61P 27/08
See application file for complete search history.

(56) References Cited

U.S. PATENT DOCUMENTS

| | | | | |
|---|---|---|---|---|
| 4,861,760 A | * | 8/1989 | Mazuel | C12P 19/04 536/123 |
| 5,326,761 A | | 7/1994 | Rozier | |
| 6,042,854 A | * | 3/2000 | Morris | A23G 1/56 426/573 |
| 2017/0368124 A1 | | 12/2017 | Syed | |

FOREIGN PATENT DOCUMENTS

| | | |
|---|---|---|
| FR | 2588189 A1 | 4/1987 |
| JP | 2009073828 A * | 4/2009 |

OTHER PUBLICATIONS

Patel et al., "Ophthalmic Drug Delivery system—A Review", 2010, Der Pharmacia Lettre, 2(4), pp. 100-115. (Year: 2010).*
English machine translation of JP-2009073828-A made Feb. 6, 2025. (Year: 2025).*

* cited by examiner

*Primary Examiner* — Michael B. Pallay
(74) *Attorney, Agent, or Firm* — Greer, Burns & Crain, Ltd.

(57) ABSTRACT

The invention relates to a specific composition comprising in particular at least gellan gum and phenylephrine. It also relates to a particular method for manufacturing such a composition and its uses in particular as a mydriatic ophthalmic product.

19 Claims, No Drawings

COMPOSITION BASED ON GELLAN GUM AND PHENYLEPHRINE, PRODUCTION METHOD AND USE AS AN OPHTHALMIC PRODUCT

CROSS-REFERENCE TO RELATED APPLICATIONS

This application is a U.S. National Stage Application of PCT/EP2020/061979 assigned the international filing date of Apr. 30, 2020 and claiming the benefit of priority from French patent application FR1904602 filed May 2, 2019, the disclosure of these applications is herein incorporated by reference.

TECHNICAL FIELD

The invention relates to a particular composition capable of gelation when it is deposited on the eye, and its use as an ophthalmic product, in particular for inducing mydriasis of the eye. The invention also relates to a particular method for the manufacture of such a composition.

BACKGROUND

Many ophthalmic exams or eye surgeries, such as cataract surgery, require dilation of the pupil, also known as mydriasis.

Several molecules are known that are capable of causing mydriasis.

This is the case in particular with phenylephrine, and more particularly with phenylephrine hydrochloride. Phenylephrine is an α-adrenergic receptor agonist with a higher affinity for al receptors, the latter being mainly located in the pupil. It allows active mydriasis to be obtained through the contraction of the radial dilator muscle. Phenylephrine is generally used in eye drops under the name Neosynephrine®.

Another molecule known for its mydriatic effect is tropicamide, a competitive antagonist of M4 receptors, which are mainly located in the iris. The mydriatic effect of tropicamide is observed 10 minutes after the first drop of eye drops is applied. Tropicamide is generally used in eye drops under the name Mydriaticum®.

Two other molecules can be used to induce mydriasis:
  atropine, but it exhibits significant side effects at the systemic level,
  cyclopentolate, but it has a short-lived effect and blocks visual accommodation.

Conventionally, to achieve pupillary dilation, it is known to use the combination of phenylephrine and tropicamide. This combination acts in synergy to allow efficient dilation of the pupil. Different methods are known for using these molecules to induce mydriasis.

The most classic method consists of the combination of two eye drops in liquid solution (Mydriaticum®: tropicamide 0.5% and Neosynephrine® 10%: phenylephrine 10%). However, administration in the form of conventional eye drops generally results in a very low ocular bioavailability of tropicamide and phenylephrine. The physiological defense mechanisms of the eye, in particular eyelid blinking and nasolacrimal drainage, cause rapid elimination of the ocular surface; this decreases the duration of the mydriasis effect, which must be compensated by repeated administrations over time. To induce an effective mydriasis, over a period of 30 to 45 minutes it is necessary to administer three to five drops of the eye drops with an interval of 5 minutes between each drop. This is therefore a restrictive protocol that leads to a long patient management time, the administration of too large a quantity of product and a significant cost in nursing time for hospital structures. In addition, the physiological defense mechanisms of the eye also cause high absorption at the systemic level, which can lead to side effects. In particular, the presence of phenylephrine at the systemic level causes strong vasoconstriction and reflex bradycardia that may be serious in patients already suffering from heat failure or arrhythmia.

Another method relies on the administration of a solid insert of phenylephrine and tropicamide. The insert is an osmotic tablet, placed in the inferior conjunctival sac by a healthcare professional, and must remain in place for 30 to 45 minutes to obtain the expected mydriatic effect. The insert must then be removed by a healthcare professional within a maximum of 2 hours following administration. The patient care time is therefore also long and the cost of the osmotic tablet is high.

Finally, there is a third method consisting of an intracameral injection of tropicamide, phenylephrine and lidocaine that has recently been marketed. However, this product cannot be used for routine examinations and is only recommended in the preoperative phase due to its administration method and the presence of an anesthetic in its composition. In addition, intraocular injection, even for preoperative mydriasis, is a complicated procedure involving a risk for the patient and has a significant cost.

Also, there is a great need for a product capable of exhibiting an efficient and rapid mydriatic effect that is easy to use and inexpensive.

SUMMARY

The objective of the present invention is to meet this need and to overcome the drawbacks of the prior art by providing a composition capable of gelling on contact with the eye.

To this end, the subject of the invention is a composition comprising at least gellan gum and phenylephrine. The combination of at least these two molecules allows the composition to be in liquid form and to gel on contact with the eye due to a variation in the ionic environment. Thus, the liquid phase allows the composition to spread and to have a larger absorption surface than the solid forms, and the gel phase makes it possible to prolong the residence time of the composition on the ocular surface. This allows easy administration and high ocular bioavailability of phenylephrine and any other molecules present in the composition. In addition, the composition, due in particular to its low viscosity, advantageously has a low industrial manufacturing cost.

In particular, a subject of the invention is a composition in the form of a solution having a viscosity of less than or equal to 500 mPa·s at a temperature between 20 and 25° C., comprising at least:
  gellan gum, and
  phenylephrine, and
  a gelation regulating agent chosen from sodium citrate, organic acids, salts of organic acids and mixtures thereof.

A subject of the invention is therefore also the use of the composition for use thereof as a non-therapeutic ophthalmic product, in particular mydriatic, or the composition for use thereof for the treatment of certain ophthalmic pathologies.

Advantageously, the composition according to the invention makes it possible to obtain an effective mydriasis in a single administration, one or two drops in liquid form, versus several instillations (2 to 8 drops) for the conventional eye drops of the prior art. Thus, the amount of phenylephrine and also of tropicamide when it is present is 4 to 8 times less than that required when using eye drops according to the prior art, and therefore exposure to the risk of local and systemic side effects is lower for the patient. In addition, the invention makes it possible to obtain optimum intensity and duration of mydriasis in less than 10 minutes. Furthermore, it is not necessary to resort to highly qualified personnel, since a single instillation of the composition according to the invention into the eye is sufficient to obtain an effective mydriasis.

The use according to the invention is therefore easy, safe and reproducible.

Other features and advantages will become apparent from the detailed description of the invention which follows.

DETAILED DESCRIPTION OF THE INVENTION

The invention therefore relates to an ophthalmic composition comprising at least gellan gum and phenylephrine. The term "ophthalmic" means suitable for use in the eye of a human being or an animal.

In particular, a subject of the invention is a composition in the form of a solution having a viscosity of less than or equal to 500 mPa·s at a temperature between 20 and 25° C., comprising at least:
 gellan gum, and
 phenylephrine, and
 a gelation regulating agent chosen from sodium citrate, organic acids, salts of organic acids and mixtures thereof.

Preferably, the composition also comprises a solvent, preferably water.

The composition is in the form of a solution with a low viscosity, namely a viscosity less than or equal to 500 mPa·s, at a temperature between 20 and 25° C., preferably a viscosity between 10 mPa·s and 500 mPa·s, at a temperature between 20 and 25° C. The composition according to the invention can exhibit the characteristic of being shear-thinning, that is to say, its viscosity varies when the product is sheared. Preferably, the composition according to the invention exhibits:
 at low shear, a viscosity of 300 to 400 mPa·s at 25° C.,
 at high shear, a viscosity of 3 to 50 mPa·s at 25° C.

All rheological analyses were performed on an Anton Paar MCR102 rheometer and all data was analyzed using dedicated software. The geometry was a stainless steel cone/plane (diameter 50 mm, angle 1° and air gap 100 µm), which provided homogeneous shear of the sample. The cone was equipped with a solvent trap to prevent evaporation during measurement. Owing to the Peltier diodes placed in the lower part of the plate, it was possible to control the temperature with an accuracy of 0.1° C. All the viscosity values presented in this document were obtained by this method.

The solution is able to gel when its ionic environment changes. Thus, when it is deposited on the surface of an eye, the composition is transformed into gelled form under the effect of the mono and divalent cations contained in the tear fluid, in particular calcium and magnesium. On reaching the surface of the eye, the composition according to the invention thus exhibits a phase transition, passing from the liquid state to the gel state. This in situ gelation allows an extension of the residence time of the composition according to the invention on the ocular surface. Surprisingly, a liquid-gel phase transition is obtained despite a decrease in ionic strength at the time of administration. This is possible because the composition according to the invention has a higher tonicity than that of the tear fluid, and consequently there is gelation during a reduction in the ionic strength. This tonicity is linked in particular to the presence of at least one gelation regulator chosen from sodium citrate, organic acids and organic acid salts.

The liquid phase advantageously allows:
 deliverability, safety and ease of administration in the eye,
 a spread and an increase in the contact surface,
 easy manufacturing and sterilization.

The gel phase advantageously allows:
 mucoadhesion,
 a long retention time on the ocular surface,
 prolonged and controlled release.

Once administered, the composition according to the invention immediately changes from a liquid state to a gel state. These rapid gelation kinetics make it possible to prevent the elimination of the composition in the liquid state. In addition, the composition according to the invention is capable of remaining in contact with the ocular surface for a long time while preserving its mechanical and rheological properties despite the dilution in the tear fluid and the eyelid blink. This prolonged contact is reinforced by a mucoadhesion phenomenon. These characteristics allow rapid and sustained release over time of phenylephrine and any other active molecules at an effective concentration.

According to another advantage, the mydriatic activity of phenylephrine and the activities of any other active molecules present in the composition are preserved.

In addition, the composition according to the invention is harmless to the ocular surface and does not interfere with the patient's vision.

All these characteristics and advantages are linked to the particular choice of gellan gum combined with phenylephrine. There are indeed many polymers known to be used in solutions capable of gelation, but only gellan gum makes it possible to satisfy all of these characteristics:
 it constitutes a vector of choice for the ocular administration of active substances,
 it is of biological origin and of saccharide nature so that it is biocompatible and biodegradable,
 it is a negatively charged polyelectrolyte at neutral pH owing to the acetate and glycerate groups present on its tetrasaccharide units,
 it is soluble in aqueous media where its polysaccharide chains are organized in a temporary and reversible three-dimensional network providing suitable viscoelastic properties, even at very low concentration,
 its shear-thinning nature allows good local tolerance by reducing the risk of irritation during eyelid blinking and its non-thixotropic behavior allows it to restructure and regain its initial viscosity after each eyelid shear,
 it has mucoadhesive power,
 its viscosity and elasticity promote its persistence at the ocular surface and allow a prolonged residence time,
 it forms a clear and transparent gel that allows the patient's vision to be maintained,
 it forms a matrix network during its gelation in the presence of cations, which gives it sustained release properties,
 it is harmless to the eye.

Preferably, the gellan gum is deacetylated gum. The deacetylated form makes it possible to obtain a transparent gel. It can be for example KELCOGEL CG-LA®. The gellan gum can optionally be acetylated gellan gum. It can for example be KELCOGEL CG-HA®.

The composition according to the invention preferably comprises at most 0.6% of gellan gum (percentage by weight of gellan gum/volume of composition), in particular from 0.05 to 0.6% (inclusive), in particular from 0.1 at 0.6% (inclusive), and in particular from 0.1% to 0.5% (inclusive). Very preferably, the composition according to the invention comprises from 0.05 to 0.25% of gellan gum (percentage by weight of gellan gum/volume of composition), in particular between 0.1 and 0.5%.

These concentrations of gellan gum are preferred in order to obtain the effects and characteristics of the composition according to the invention.

The composition according to the invention preferably comprises at least 0.1% of phenylephrine (percentage by weight of phenylephrine/volume of composition), even more preferably between 0.1 and 10%. These phenylephrine concentrations are compatible with the association of the molecule with gellan gum in the composition according to the invention, and also make it possible to obtain an effective mydriatic effect without adverse effect.

According to a suitable embodiment, phenylephrine is a salt of phenylephrine and in particular phenylephrine hydrochloride.

In addition to gellan gum, phenylephrine and the optional solvent, the composition according to the invention also comprises a gelation regulating agent to promote the gelation phase when the composition is deposited on the eye. The composition according to the invention preferably comprises at least one gelation regulating agent chosen in particular from sodium citrate, organic acids, salts of organic acids and mixtures thereof. It is preferably sodium citrate. Sodium citrate allows better hydration of the gellan gum chains during the preparation of the stock solution. Its properties as a cation chelator allow it to capture the residual cations contained in gellan gum. Thus, in the absence of cations, the gellan gum chains are more extended and the polymer is better hydrated. This imparts better gelation properties and higher viscosity to the composition. This also allows a decrease in the hydration temperature of the gellan gum. In addition, the presence of sodium citrate makes it possible to reduce the degradation of phenylephrine, which is sensitive to oxidation.

The gelation regulator chosen from sodium citrate, organic acids, salts of organic acids and mixtures thereof is preferably present between 0.01 and 0.2% (inclusive) by weight of gelation regulating agent (sodium citrate and/or organic acids and/or salts of organic acids and/or mixtures thereof)/volume of composition.

In addition to this or these gelling regulating agent(s), the composition according to the invention may optionally comprise at least one other gelation regulating agent, preferably chosen from chelating agents and mixtures thereof. The chelating agent is preferably present between 0.01 and 0.2% (inclusive) by weight of chelating agent/volume of composition.

It could for example be:
EDTA,
sodium, potassium or calcium tartrates or tartaric acids, potassium, magnesium or citric acid citrates.

Advantageously, the presence of a chelating agent makes it possible to reduce the degradation of phenylephrine, which is sensitive to oxidation.

The composition according to the invention can also comprise at least one antioxidant agent. It can for example be ascorbic acid, malic acid, citric acid or their sodium equivalents, sodium ascorbate, sodium maleate, EDTA or sodium citrate.

The composition according to the invention can also comprise other constituents, in particular tropicamide for its synergistic mydriatic action with phenylephrine. Preferably, the tropicamide is present in the composition in an amount of at least 0.1% (percentage by weight of tropicamide/volume of composition); even more preferably, the composition comprises from 0.1 to 10% (inclusive) of tropicamide.

The composition according to the invention can also comprise at least one cellulose derivative. It may preferably be hydroxyethylcellulose (for example NATROSOL 250M®, NATROSOL 250G®) and/or hydroxypropylmethylcellulose. Cellulose derivatives, and in particular hydroxyethylcellulose and hydroxypropylmethylcellulose, are well tolerated and, combined with gellan gum, exhibit suitable viscosity and texture properties. They make it possible to further improve the viscosity, the mucoadhesion and the release properties of the active molecules of the compositions according to the invention.

Preferentially, the cellulose derivatives are present in an amount of 0 to 2% (inclusive) by weight of cellulose derivatives/volume of composition, even more preferably from 0 to 1% (inclusive). According to one embodiment, the composition according to the invention comprises 0 to 1% of hydroxyethylcellulose and 0 to 1% of hydroxypropylmethylcellulose.

The composition according to the invention can be obtained by any suitable manufacturing/preparation method.

Preferably, the composition according to the invention is obtained by carrying out a preparation method that comprises the following steps:
Preparation of a solution A comprising at least gellan gum and a gelation regulating agent chosen from sodium citrate, organic acids, salts of organic acids and mixtures thereof, and optionally also a chelating agent and/or an organic acid and/or an antioxidant and/or water,
Preparation of a solution B comprising at least phenylephrine, and optionally also tropicamide and/or a cellulose derivative and/or water.
Mixing solution A and solution B, solution A representing between 20 and 40% and solution B between 60 and 80%, the percentages being given by weight of the total weight of the mixture of the two solutions.

Very preferably, the solution containing the gellan gum (solution A) is poured into the solution containing the phenylephrine (solution B). This makes it possible to obtain a homogeneous, transparent, fluid and low viscosity preparation.

Preferably, solution A is prepared by carrying out the following steps:
dissolve, in water, the gellan gum and the gelation regulating agent chosen from sodium citrate, organic acids, salts of organic acids and mixtures thereof, and optionally the chelating agent and/or the antioxidant agent, preferably with stirring,
heat the solution between 60° C. and 90° C., preferably with stirring,
continue to stir for 1 to 15 minutes,
stop heating and continue to stir until the temperature reaches 15° C. to 30° C.,
optionally, perform sterilizing filtration, preferably with a filter with a porosity less than or equal to 0.22 µm.

Preferably, solution B is prepared by carrying out the following steps:
dissolve phenylephrine and possibly tropicamide in water, stir for 1 to 3 hours until complete dissolution,
optionally, dissolve the cellulose derivative,
optionally, perform sterilizing filtration, preferably with a filter with a porosity less than or equal to 0.22 μm.

Preferably, the mixing of solution A and solution B is done by carrying out the following steps:
stir solution A, preferably stirring slowly for greater homogeneity,
add solution B, while stirring, preferably stirring slowly for greater homogeneity,
continue to stir until a homogeneous mixture is obtained.

The composition according to the invention is preferably stored in single-dose containers suitable for ophthalmic use. They are preferably stored at ambient temperature and/or under conditions allowing their conservation until use.

The composition according to the invention can be used as an ophthalmic product, in particular as a non-therapeutic ophthalmic product. The invention is therefore aimed at such a use. Indeed, the composition is characterized in that it gels when it is deposited on the surface of the eye under the effect of the mono and divalent cations contained in the tear fluid.

In particular, the invention relates to the use of a composition as described above as a mydriatic ophthalmic product. Indeed, the composition according to the invention can be used in the eye of a human being or of an animal to induce mydriasis, in particular before an operation of said eye or before an examination of said eye. The composition according to the invention can be used to induce mydriasis in less than 10 minutes, and which lasts more than 120 minutes.

The use according to the invention preferably consists in applying at least one drop in the eye. Indeed, a single drop is enough to induce mydriasis quickly and for a long time.

Independently of its non-therapeutic use for inducing dilation of the pupil prior to an examination or an operation of the eye in order to facilitate these procedures, the composition according to the invention can be used as a medicament in the treatment of ocular pathologies, and in particularly in the treatment of uveal inflammation (anterior and posterior uveitis, uveal reactions secondary to trauma or surgery, to prevent or stop the formation of posterior synechiae) and/or keratitis. In fact, the induced dilation makes it possible to treat these pathologies.

The invention is now illustrated by examples of compositions according to the invention and by test results demonstrating the effect of the invention, in particular the mydriatic effect.

EXAMPLES

Example 1: Example of Gellan-Phenylephrine Composition

The composition of Example 1 consists of:
gellan gum: 0.5%
sodium citrate: 0.05%
phenylephrine: 9%
water: QS
The composition is obtained by carrying out the following steps:
Preparing a solution A in tank 1:
dissolve the gellan gum and the sodium citrate in water with stirring,
heat the solution to 75° C., with stirring,
continue to stir for 5 minutes,
stop heating and continue to stir until it returns to room temperature,
transfer to tank 3 with sterilizing filtration;
Preparing a solution B in tank 2:
dissolve phenylephrine in water,
continue to stir for approximately 1 hour 45 minutes until complete dissolution,
transfer to tank 3 with sterilizing filtration;
Final mixing in tank 3:
stir solution A,
add solution B while stirring,
continue to stir until a homogeneous mixture is obtained.

Example 2: Example of Gellan-Phenylephrine Composition

The composition of Example 2 consists of:
gellan gum: 0.2%
sodium citrate: 0.08%
0.1% hydroxyethylcellulose and/or 0.1% hydroxypropylmethylcellulose
phenylephrine: 9%
water: QS
The composition is obtained by carrying out the following steps:
Preparing a solution A in tank 1:
dissolve the gellan gum and the sodium citrate in water with stirring,
heat the solution to 75° C., with stirring,
continue to stir for 5 minutes,
stop heating and continue to stir until it returns to room temperature,
transfer to tank 3 with sterilizing filtration;
Preparing a solution B in tank 2:
dissolve phenylephrine in water,
continue to stir for approximately 1 hour 45 minutes until complete dissolution,
dissolve the hydroxyethylcellulose and/or the hydroxypropylmethylcellulose while stirring,
transfer to tank 3 with sterilizing filtration;
Final mixing in tank 3:
stir solution A,
add solution B while stirring,
continue to stir until a homogeneous mixture is obtained.

Example 3: Example of Gellan-Phenylephrine Composition

The composition of Example 3 consists of:
gellan gum: 0.2%
sodium citrate: 0.1%
phenylephrine: 7%
tropicamide: 0.5%
water: QS
The composition is obtained by carrying out the following steps:
Preparing a solution A in tank 1:
dissolve the gellan gum and the sodium citrate in water with stirring,
heat the solution to 75° C., with stirring,
continue to stir for 5 minutes,
stop heating and continue to stir until it returns to room temperature,
transfer to tank 3 with sterilizing filtration;

Preparing a solution B in tank 2:
  dissolve phenylephrine and tropicamide in water,
  continue to stir for approximately 2 hours until complete dissolution,
  transfer to tank 3 with sterilizing filtration;
Final mixing in tank 3:
  stir solution A,
  add solution B while stirring,
  continue to stir until a homogeneous mixture is obtained.

Example 4: Example of Gellan-Phenylephrine Composition

The composition of Example 4 consists of:
gellan gum: 0.2%
sodium citrate: 0.05%
phenylephrine: 8%
tropicamide: 0.6%
water: QS
The composition is obtained by carrying out the following steps:
Preparing a solution A in tank 1:
  dissolve the gellan gum and the sodium citrate in water with stirring,
  heat the solution to 75° C., with stirring,
  continue to stir for 5 minutes,
  stop heating and continue to stir until it returns to room temperature,
  transfer to tank 3 with sterilizing filtration;
Preparing a solution B in tank 2:
  dissolve phenylephrine and tropicamide in water,
  continue to stir for approximately 2 hours until complete dissolution,
  transfer to tank 3 with sterilizing filtration;
Final mixing in tank 3:
  stir solution A,
  add solution B while stirring,
  continue to stir until a homogeneous mixture is obtained.

Example 5: Example of Gellan-Phenylephrine Composition

The composition of Example 5 consists of:
gellan gum: 0.15%
sodium citrate: 0.09%
hydroxyethylcellulose 0.25%
phenylephrine: 5%
tropicamide: 0.5%
water: QS
The composition is obtained by carrying out the following steps:
Preparing a solution A in tank 1:
  dissolve the gellan gum and the sodium citrate in water with stirring,
  heat the solution to 75° C., with stirring,
  continue to stir for 4 minutes,
  stop heating and continue to stir until it returns to room temperature,
  transfer to tank 3 with sterilizing filtration;
Preparing a solution B in tank 2:
  dissolve phenylephrine and tropicamide in water,
  continue to stir for approximately 2 hours until complete dissolution,
  dissolve the hydroxyethylcellulose and/or the hydroxypropylmethylcellulose while stirring,
  transfer to tank 3 with sterilizing filtration;
Final mixing in tank 3:
  stir solution A,
  add solution B while stirring,
  continue to stir until a homogeneous mixture is obtained.

Tests and Results

In the studies presented below, three compositions according to the invention were tested. They are presented in Table 1.

TABLE 1

| | Gellan gum (% m/v) | Phenylephrine (% m/v) | Tropicamide (% m/v) | Sodium citrate (% m/v) | Hydroxyethyl-cellulose (% w/v) |
|---|---|---|---|---|---|
| A | 0.15 | 5.0 | 0.5 | 0.09 | 0 |
| B | 0.15 | 5.0 | 0.5 | 0.09 | 0.25 |
| C | 0.15 | 5.0 | 0.5 | 0.09 | 0.5 |

I. In Vitro Study Demonstrating the Liquid State of Compositions According to the Invention Before Administration and their Gelation in the Presence of Artificial Tear Fluid Compositions A, B and C were evaluated with regard to pH, osmolarity and transparency and their rheological properties, as well as their viscosity and their gelling power.

Transparency

The percentage of light transmittance in the visible light spectrum of 400 to 800 nm wavelength against water as a reference was measured using a UV-Vis Perkin-Elmer Lambda 25 spectrometer. Measurements were performed in triplicate and the mean±SD value for each composition was calculated.

pH Measurement

The pH of the compositions was measured using a previously calibrated pH meter. The compositions were tested in triplicate for pH and the mean±SD value was calculated.

Osmolarity

The osmolarity of the compositions was tested using an automatic osmometer. Before use, the device was calibrated with sterile distilled water (0 mOsm/L) and a standard solution of 300 mOsm/L. Measurements were performed in triplicate and the mean±SD value for each composition was calculated.

Rheological Studies

All rheological analyses were performed on a rheometer and all data was analyzed using dedicated software. The geometry was a stainless steel cone/plane (diameter 50 mm, angle 1° and air gap 100 µm), which provided homogeneous shear of the sample. The cone was equipped with a solvent trap to prevent evaporation during measurement. Owing to the Peltier diodes that were placed in the lower part of the plate, it was possible to control the temperature with an accuracy of 0.1° C.

Evaluation of Viscoelastic Behavior and Gelation

The viscoelastic behaviors of the in situ gelation systems were evaluated, before and after addition of simulated tear fluid (STF), at 25 and 35° C., respectively. Oscillatory experiments were performed. The storage modulus G' and the loss modulus G" were measured. Experiments were performed with frequency and amplitude values belonging to a linear viscoelastic regime where G' remained invariant and the sample was not subjected to structural changes. The frequency was 1 Hz and the amplitude 0.1%. The results correspond to the mean±SD of n=6 experiments. STF was added at a ratio of 7:30 corresponding to the ratio of the volume of physiological tear fluid to the instilled drop composition. The physiological volume of tear fluid is 7 µl and the average volume of a drop of eye drops is 30 µl. The composition of STF is shown in Table 2.

TABLE 2

|  | Weight (g) |
| --- | --- |
| Sodium chloride | 0.670 |
| Sodium bicarbonate | 0.200 |
| Calcium chloride | 0.008 |
| Magnesium chloride | 0.005 |
| Potassium chloride | 0.138 |
| Water | 98.979 |

Flow Behavior and Viscosity

The flow properties of the aforementioned in situ gels were determined after addition of STF at 35° C. After 2 min, the shear rate was gradually increased from 0.1 to 5000 s−1 (ascending curve). Then the shear rate was kept at 5000 s−1 for 30 seconds and then gradually decreased from 5000 to 0.1 s−1 (descending curve). Results are the mean±SD of n=6 experiments.

$$\eta = \eta_\infty + \frac{\eta_0 - \eta_\infty}{1 + (C\dot\gamma)^m}$$

The viscosity curves were fitted according to the following cross equation.

Where η represents the apparent viscosity at a given shear rate (mPa·s), $\dot\gamma$ is the shear rate (s−1), η0 is the zero shear viscosity (mPa·s), η∞ is the viscosity at infinite shear (mPa·s), C is the time constant (s) and the converse, 1/C gives a critical shear rate, which is a useful indicator of the shear rate, m is Cross's constant, it is dimensionless and is a measure of the degree of dependence of viscosity on shear rate. A value of zero for m indicates Newtonian behavior, while values of m tending toward 1 indicate an increase in shear thinning behavior.

Evaluation of Viscoelastic Behavior and Gelation

The oscillatory experiments were mainly used to determine whether the compositions according to the invention were liquid or gel, with or without STF.

The higher the value G', the more pronounced the elastic nature is. Conversely, the higher value G', the more pronounced the viscous properties are. To extrapolate, it can be considered that when the value G" is greater than the value G', the preparation exhibits a dominant viscous behavior (that is to say, similar to a liquid). Conversely, when the value G' is greater than the value G", the preparation exhibits a dominant elastic behavior (i.e. similar to a solid). Then the tangent of the phase angle, which is a useful quantifier of the presence and extent of elasticity in a fluid, can be calculated as follows: tan δ=G"/G'. Thus, a viscous state (liquid type) is observed when tan δ>1. A gel state (solid type) is observed when tan δ≤1. Beyond this critical gel point, the preparations do not necessarily appear to be cohesive, but can be in the form of a fluid gel also called a "weak gel." This behavior is highly sought after with regard to ocular administration.

The storage modulus (G'), loss modulus (G") and phase angle tangent (tan δ) values are shown in Table 7.

The obtained results are shown in the following tables (Table 3: pH and osmolarity; Table 4: transmittance; Tables 5 and 6: viscosity and thixotropy; Table 7: viscoelastic behavior and gelation).

TABLE 3

| Compositions | pH | Osmolarity |
| --- | --- | --- |
| A | 6.46 ± 0.02 | 438 ± 2.1 |
| B | 6.49 ± 0.02 | 438.7 ± 5.0 |
| C | 6.50 ± 0.02 | 434.3 ± 5.0 |

The three compositions according to the invention exhibit similar pH and osmolarities. With pH values between 6.45 and 6.50, the pH values are slightly acidic but sufficiently close to neutral and are within the appropriate pH range for use in ophthalmology.

Regarding osmolarity, values of 430-440 mOsm/L have been found. At first glance, these results show a relatively large deviation from isotonicity (300-320 mOsm/L). However, these high osmolarity values are almost only due to the high proportion of phenylephrine hydrochloride in the compositions, which is necessary to achieve mydriasis. The osmolarity of commercially available mydriatic eye drops containing 10% phenylephrine hydrochloride has been shown to be greater than 900 mOsm/L. Consequently, while being relatively higher than the physiological osmolarity, the osmolarities of the compositions according to the invention are optimized and reduced by half compared to the mydriatic eye drops used in the prior art.

TABLE 4

| Wavelength (nm) | Composition A | | Composition B | | Composition C | |
| --- | --- | --- | --- | --- | --- | --- |
|  | Mean | SD | Mean | SD | Mean | SD |
| 400 | 96.35 | 0.22 | 91.50 | 0.05 | 90.55 | 1.06 |
| 500 | 98.30 | 0.09 | 95.30 | 0.07 | 94.51 | 1.02 |
| 600 | 98.86 | 0.05 | 96.68 | 0.02 | 95.95 | 1.00 |
| 700 | 99.03 | 0.22 | 97.48 | 0.05 | 96.80 | 0.88 |
| 800 | 99.15 | 0.29 | 98.00 | 0.05 | 97.43 | 0.71 |

The percentage of light transmittance of the compositions according to the invention is greater than 90% over the entire visible range, which makes them suitable for ophthalmic use. In addition, increasing the HEC concentration revealed a slight decrease in transparency, which can be attributed to the intrinsic properties of the polymer.

TABLE 5

|  | $\eta_0$ (mPa · s) | η at 5000 s−1 (mPa · s) | $\eta_\infty$ (mPa · s) | Cross constant m |
| --- | --- | --- | --- | --- |
| A | 108613 ± 14 | 3.9 ± 0.2 | 3.2 ± 0.5 | 0.66 ± 0.04 |
| B | 81164 ± 8 | 7.4 ± 0.2 | 4.3 ± 0.5 | 0.56 ± 0.02 |
| C | 105085 ± 20 | 10.9 ± 0.6 | 4.8 ± 0.4 | 0.52 ± 0.03 |

TABLE 6

| Shear rate (s − 1) | Composition A | | | | Composition B | | | | Composition C | | | |
|---|---|---|---|---|---|---|---|---|---|---|---|---|
| | Ascending | | Descending | | Ascending | | Descending | | Ascending | | Descending | |
| | Mean | SD | Mean | SD | Mean | SD | Mean | SD | Mean | SD | Mean | SD |
| 0.101 | 1457.15 | 200.82 | 1219.25 | 133.81 | 1573.75 | 239.32 | 1075.75 | 87.82 | 2521.77 | 284.82 | 1263.55 | 154.95 |
| 0.184 | 860.05 | 99.44 | 734.10 | 48.49 | 1118.68 | 239.87 | 729.70 | 67.06 | 1863.67 | 182.06 | 860.45 | 157.69 |
| 0.334 | 568.13 | 68.21 | 487.65 | 24.97 | 777.67 | 124.30 | 508.35 | 47.16 | 1309.98 | 63.24 | 560.77 | 71.91 |
| 0.609 | 393.93 | 53.10 | 319.62 | 24.12 | 590.03 | 64.03 | 360.48 | 36.09 | 903.72 | 67.48 | 417.75 | 40.05 |
| 1.11 | 275.42 | 39.88 | 207.90 | 15.58 | 396.37 | 42.99 | 228.00 | 22.93 | 655.72 | 32.17 | 317.07 | 28.70 |
| 2.02 | 186.03 | 29.11 | 135.62 | 10.18 | 285.27 | 22.16 | 155.18 | 12.07 | 483.73 | 23.11 | 223.88 | 24.98 |
| 3.69 | 124.53 | 18.58 | 85.08 | 6.35 | 197.03 | 10.62 | 110.50 | 7.03 | 357.17 | 25.99 | 146.75 | 18.93 |
| 6.73 | 79.93 | 13.19 | 51.62 | 2.68 | 140.80 | 4.84 | 78.02 | 4.45 | 258.17 | 17.77 | 97.50 | 12.53 |
| 12.3 | 54.40 | 7.61 | 32.07 | 1.30 | 102.08 | 4.57 | 54.18 | 2.46 | 189.35 | 20.15 | 70.35 | 8.08 |
| 22.4 | 39.30 | 6.19 | 21.00 | 1.06 | 75.30 | 3.42 | 38.02 | 1.50 | 141.10 | 17.14 | 54.78 | 5.51 |
| 40.8 | 28.05 | 5.69 | 14.58 | 0.92 | 56.22 | 5.52 | 27.83 | 0.98 | 100.47 | 9.04 | 44.85 | 4.10 |
| 74.4 | 21.47 | 5.49 | 10.68 | 0.57 | 42.98 | 3.21 | 21.67 | 0.73 | 79.95 | 6.71 | 37.50 | 3.18 |
| 136 | 15.07 | 1.83 | 8.10 | 0.23 | 33.13 | 3.22 | 17.50 | 0.59 | 57.00 | 4.75 | 31.57 | 2.47 |
| 248 | 11.52 | 0.96 | 6.40 | 0.17 | 24.90 | 1.82 | 14.55 | 0.45 | 41.55 | 2.28 | 26.45 | 1.95 |
| 452 | 9.27 | 0.91 | 5.27 | 0.24 | 18.65 | 0.91 | 12.35 | 0.38 | 32.23 | 1.50 | 22.02 | 1.53 |
| 824 | 7.33 | 0.78 | 4.55 | 0.20 | 14.73 | 0.30 | 10.50 | 0.35 | 25.22 | 1.05 | 18.12 | 1.21 |
| 1500 | 5.80 | 0.42 | 4.05 | 0.21 | 11.65 | 0.23 | 9.07 | 0.29 | 19.53 | 0.79 | 14.77 | 0.95 |
| 2740 | 4.67 | 0.29 | 3.70 | 0.22 | 9.33 | 0.23 | 7.78 | 0.17 | 14.85 | 0.66 | 12.05 | 0.76 |
| 5000 | 3.88 | 0.20 | 3.60 | 0.19 | 7.40 | 0.17 | 7.00 | 0.17 | 10.90 | 0.57 | 10.05 | 0.63 |

The three examples of compositions according to the invention exhibit flow behaviors and viscosities suitable for ocular administration. Composition A first exhibits very low viscosity under high shear rates, but is restored almost instantly when the shear is stopped. Compositions B and C with the viscosity regulating agent are more suitable because they exhibit higher viscosities with high shear rates, followed by delayed and incomplete recovery at rest. The shear thinning behavior presents real advantages for the compositions intended to remain on the ocular surface. It allows a high viscosity at rest when the eye is open and a low viscosity under the eyelid shear, thus avoiding irritation and discomfort.

TABLE 7

| Composition | Storage modulus, G' (Pa) | Loss modulus, G" (Pa) | Tangent of the phase angle, tanδ | Viscoelastic behavior |
|---|---|---|---|---|
| A | 0.117 ± 0.023 | 0.217 ± 0.011 | 1.855 | Liquid |
| B | 0.422 ± 0.081 | 0.574 ± 0.056 | 1.360 | Liquid |
| C | 0.622 ± 0.091 | 1.122 ± 0.071 | 1.804 | Liquid |
| A + STF | 17.545 ± 1.061 | 2.262 ± 0.366 | 0.129 | Low gel |
| B + STF | 14.036 ± 1.723 | 2.283 ± 0.348 | 0.163 | Low gel |
| C + STF | 18.154 ± 3.403 | 3.468 ± 0.631 | 0.191 | Low gel |

Before the addition of STF, the three compositions according to the invention exhibit a liquid-type behavior with very low storage and loss moduli values and phase angle tangents greater than 1. Liquid-like behavior before administration is a prerequisite for in situ gelling delivery systems allowing good flow and the ability to form drops. Thus, the compositions according to the invention are suitable for easy, safe and reproducible ocular administration.

After addition of STF, the compositions according to the invention have undergone a liquid/gel transition. Indeed, the storage moduli have been increased by 30 times and the observed phase angle tangents are less than 1. These measurements made it possible to evaluate the gelation in vitro due to the ionic interactions between the compositions according to the invention and the mono and divalent cations of the tear fluid.

II. In Vitro Study Simulating Eyelid Blinking in Order to Determine the Rheological Behavior of the Compositions According to the Invention on the Ocular Surface In order to complete the previous observations, two rheological experiments were developed. The compositions according to the invention were subjected to a series of simulated eye blinks (i.e. high shear rates followed by periods of rest) in order to predict the rheological behavior over time on the ocular surface.

Rotation Measurements

The first test measures the viscosity during the rest intervals following the blinks. With each simulated blink, the viscosities reached a minimum due to the shear thinning behavior, then were recovered during the rest periods. The results corresponding to the shear cycles (viscosity) are presented in Table 8.

TABLE 8

| | Composition A | | Composition B | | Composition C | |
|---|---|---|---|---|---|---|
| Time (s) | Mean | SD | Mean | SD | Mean | SD |
| 0.5 | 3.33 | 0.31 | 4.96 | 0.28 | 7.66 | 0.24 |
| 1 | 3.03 | 0.23 | 4.62 | 0.24 | 7.38 | 0.15 |
| 2 | 46.61 | 9.46 | 29.39 | 4.25 | 44.90 | 6.79 |
| 3 | 108.80 | 27.85 | 52.26 | 7.35 | 65.83 | 10.89 |
| 4 | 154.18 | 37.27 | 77.01 | 10.64 | 85.60 | 16.88 |
| 5 | 174.73 | 42.02 | 101.66 | 13.66 | 112.47 | 27.22 |
| 10 | 192.12 | 49.23 | 154.26 | 10.64 | 291.61 | 93.27 |
| 15 | 193.54 | 51.27 | 164.92 | 10.62 | 336.91 | 79.25 |
| 20 | 189.57 | 48.08 | 173.67 | 13.14 | 356.65 | 69.79 |
| 30 | 173.15 | 44.00 | 179.75 | 17.35 | 365.61 | 63.22 |
| 45 | 157.29 | 40.78 | 182.12 | 20.01 | 357.53 | 60.06 |
| 60 | 151.96 | 43.99 | 172.69 | 23.23 | 346.81 | 62.81 |
| 61.5 | 3.38 | 0.26 | 4.81 | 0.25 | 7.58 | 0.22 |
| 62 | 3.08 | 0.23 | 4.65 | 0.23 | 7.32 | 0.16 |
| 63 | 51.23 | 8.62 | 26.84 | 2.87 | 39.08 | 4.90 |
| 64 | 102.87 | 12.62 | 44.33 | 5.22 | 54.14 | 7.04 |
| 65 | 124.22 | 11.51 | 56.81 | 8.50 | 65.74 | 10.03 |
| 66 | 146.86 | 20.93 | 67.20 | 10.84 | 78.08 | 14.44 |
| 71 | 192.39 | 54.35 | 91.83 | 13.63 | 155.95 | 47.70 |
| 76 | 207.33 | 54.89 | 100.55 | 15.73 | 200.83 | 63.03 |
| 81 | 214.57 | 48.31 | 105.01 | 13.97 | 216.13 | 61.44 |
| 91 | 209.30 | 49.28 | 110.09 | 12.62 | 227.40 | 54.52 |
| 106 | 203.05 | 41.30 | 114.32 | 9.28 | 239.19 | 54.22 |
| 121 | 197.05 | 41.50 | 114.87 | 11.56 | 239.99 | 48.10 |

TABLE 8-continued

| | Composition A | | Composition B | | Composition C | |
|---|---|---|---|---|---|---|
| Time (s) | Mean | SD | Mean | SD | Mean | SD |
| 122.5 | 3.26 | 0.21 | 4.80 | 0.25 | 7.49 | 0.23 |
| 123 | 3.04 | 0.18 | 4.69 | 0.24 | 7.37 | 0.20 |
| 124 | 53.93 | 7.24 | 25.07 | 3.82 | 36.20 | 3.77 |
| 125 | 103.70 | 16.42 | 38.55 | 4.44 | 48.60 | 5.35 |
| 126 | 131.89 | 24.60 | 46.95 | 7.79 | 56.46 | 7.31 |
| 127 | 149.27 | 32.24 | 52.95 | 8.17 | 63.96 | 9.73 |
| 132 | 190.16 | 44.02 | 69.16 | 9.78 | 103.12 | 25.60 |
| 137 | 216.52 | 59.05 | 75.86 | 9.42 | 131.95 | 38.81 |
| 142 | 215.82 | 33.55 | 80.14 | 9.52 | 149.56 | 44.27 |
| 152 | 228.13 | 52.39 | 85.60 | 7.95 | 163.06 | 46.65 |
| 167 | 221.90 | 41.72 | 92.30 | 7.61 | 172.50 | 44.35 |
| 182 | 214.54 | 35.53 | 95.70 | 7.73 | 178.01 | 40.81 |
| 183.5 | 3.22 | 0.20 | 4.80 | 0.26 | 7.48 | 0.26 |
| 184 | 3.04 | 0.19 | 4.72 | 0.25 | 7.40 | 0.23 |
| 185 | 55.50 | 6.96 | 22.50 | 3.25 | 34.91 | 2.67 |
| 186 | 107.67 | 25.70 | 35.31 | 4.16 | 44.56 | 4.10 |
| 187 | 130.29 | 21.35 | 41.59 | 5.47 | 50.75 | 5.51 |
| 188 | 152.62 | 36.57 | 46.82 | 5.82 | 55.84 | 7.83 |
| 193 | 201.52 | 59.11 | 58.66 | 7.59 | 80.46 | 17.76 |
| 198 | 216.82 | 56.93 | 64.58 | 7.99 | 99.08 | 25.01 |
| 203 | 223.60 | 54.81 | 68.68 | 8.02 | 111.81 | 29.41 |
| 213 | 226.93 | 47.86 | 72.84 | 6.36 | 123.17 | 34.96 |
| 228 | 219.29 | 41.20 | 79.63 | 6.97 | 136.11 | 37.12 |
| 243 | 214.68 | 37.27 | 86.13 | 8.40 | 143.17 | 36.82 |
| 244.5 | 3.21 | 0.18 | 4.80 | 0.26 | 7.47 | 0.28 |
| 245 | 3.05 | 0.20 | 4.73 | 0.26 | 7.41 | 0.25 |
| 246 | 59.55 | 11.75 | 22.39 | 2.39 | 34.40 | 4.49 |
| 247 | 103.59 | 21.76 | 34.89 | 3.67 | 44.06 | 5.39 |
| 248 | 129.92 | 29.06 | 41.59 | 4.42 | 48.24 | 6.85 |
| 249 | 148.09 | 36.00 | 45.49 | 4.88 | 52.16 | 7.48 |
| 254 | 188.14 | 48.40 | 54.69 | 6.78 | 70.22 | 15.07 |
| 259 | 203.61 | 46.88 | 59.43 | 6.44 | 83.34 | 18.36 |
| 264 | 214.35 | 43.61 | 63.16 | 6.42 | 93.41 | 22.43 |
| 274 | 221.77 | 41.98 | 66.87 | 6.37 | 100.59 | 27.17 |
| 289 | 219.16 | 41.18 | 74.78 | 6.53 | 111.51 | 30.00 |
| 304 | 210.79 | 44.17 | 79.74 | 6.93 | 118.10 | 28.83 |
| 305.5 | 3.20 | 0.18 | 4.80 | 0.25 | 7.45 | 0.29 |
| 306 | 3.03 | 0.17 | 4.74 | 0.25 | 7.40 | 0.28 |
| 307 | 57.08 | 10.19 | 21.68 | 2.01 | 32.51 | 3.78 |
| 308 | 99.45 | 19.48 | 33.34 | 2.55 | 41.62 | 5.30 |
| 309 | 123.61 | 26.70 | 39.36 | 3.47 | 46.74 | 6.34 |
| 310 | 140.68 | 33.61 | 43.13 | 2.67 | 51.34 | 7.55 |
| 315 | 180.03 | 42.74 | 53.35 | 4.40 | 66.07 | 12.34 |
| 320 | 195.21 | 42.72 | 56.86 | 5.25 | 74.48 | 16.15 |
| 325 | 203.15 | 41.78 | 58.75 | 4.49 | 81.41 | 19.50 |
| 335 | 209.75 | 36.90 | 64.44 | 3.47 | 87.91 | 21.99 |
| 350 | 211.00 | 33.84 | 70.00 | 3.38 | 97.06 | 24.77 |
| 365 | 203.25 | 32.52 | 75.10 | 4.98 | 101.85 | 23.65 |
| 366.5 | 3.20 | 0.16 | 4.80 | 0.24 | 7.43 | 0.29 |
| 367 | 3.04 | 0.15 | 4.75 | 0.24 | 7.39 | 0.29 |
| 368 | 56.01 | 5.43 | 20.99 | 2.63 | 31.48 | 4.08 |
| 369 | 102.51 | 27.58 | 31.84 | 3.02 | 40.59 | 5.46 |
| 370 | 127.74 | 39.17 | 37.60 | 3.29 | 44.79 | 6.35 |
| 371 | 140.87 | 39.33 | 41.90 | 3.51 | 49.21 | 6.94 |
| 376 | 182.44 | 52.52 | 50.90 | 3.64 | 63.20 | 10.86 |
| 381 | 193.99 | 51.29 | 55.23 | 3.03 | 70.96 | 16.30 |
| 386 | 198.55 | 48.26 | 58.67 | 5.05 | 75.95 | 18.95 |
| 396 | 207.35 | 42.59 | 61.96 | 3.85 | 82.41 | 18.01 |
| 411 | 201.44 | 40.08 | 68.44 | 4.11 | 88.29 | 21.89 |
| 426 | 196.94 | 40.08 | 73.05 | 2.45 | 93.36 | 23.60 |
| 427.5 | 3.19 | 0.15 | 4.80 | 0.23 | 7.40 | 0.28 |
| 428 | 3.04 | 0.15 | 4.75 | 0.24 | 7.37 | 0.29 |
| 429 | 58.05 | 12.97 | 22.21 | 3.53 | 32.14 | 2.98 |
| 430 | 100.07 | 26.54 | 32.64 | 3.60 | 41.31 | 3.83 |
| 431 | 123.65 | 34.67 | 38.11 | 4.46 | 45.17 | 5.53 |
| 432 | 138.19 | 37.24 | 42.01 | 4.67 | 48.40 | 6.73 |
| 437 | 173.61 | 46.47 | 50.43 | 3.43 | 59.92 | 13.18 |
| 442 | 185.39 | 44.57 | 53.96 | 4.01 | 66.92 | 14.53 |
| 447 | 191.98 | 42.64 | 58.20 | 3.94 | 73.22 | 15.70 |
| 457 | 197.54 | 39.06 | 60.57 | 3.58 | 77.26 | 19.45 |
| 472 | 196.30 | 36.24 | 67.02 | 4.05 | 84.15 | 20.31 |
| 487 | 189.94 | 34.14 | 72.53 | 3.64 | 88.16 | 20.47 |
| 488.5 | 3.19 | 0.17 | 4.81 | 0.23 | 7.37 | 0.25 |
| 489 | 3.05 | 0.15 | 4.76 | 0.24 | 7.34 | 0.27 |
| 490 | 60.79 | 15.87 | 21.11 | 3.42 | 29.69 | 3.24 |
| 491 | 106.09 | 39.90 | 31.61 | 3.76 | 38.22 | 5.23 |
| 492 | 129.07 | 48.93 | 37.50 | 4.38 | 42.26 | 6.33 |
| 493 | 143.92 | 53.52 | 41.12 | 4.77 | 46.19 | 6.60 |
| 498 | 178.40 | 58.14 | 49.78 | 5.00 | 60.14 | 12.43 |
| 503 | 188.82 | 55.47 | 52.43 | 4.68 | 66.96 | 14.40 |
| 508 | 193.54 | 51.97 | 55.16 | 4.41 | 69.97 | 16.66 |
| 518 | 197.36 | 47.54 | 59.68 | 5.84 | 75.75 | 19.04 |
| 533 | 194.06 | 39.97 | 64.90 | 5.16 | 80.34 | 21.51 |
| 548 | 186.79 | 36.03 | 69.28 | 4.04 | 85.38 | 20.34 |
| 549.5 | 3.17 | 0.18 | 4.81 | 0.23 | 7.35 | 0.22 |
| 550 | 3.06 | 0.16 | 4.77 | 0.24 | 7.32 | 0.24 |
| 551 | 59.99 | 15.29 | 20.98 | 2.45 | 31.34 | 2.22 |
| 552 | 99.59 | 28.48 | 30.89 | 3.19 | 39.53 | 3.79 |
| 553 | 120.21 | 34.05 | 35.85 | 3.52 | 43.11 | 5.48 |
| 554 | 133.98 | 38.89 | 38.92 | 4.28 | 46.13 | 7.25 |
| 559 | 166.84 | 48.71 | 47.62 | 6.63 | 56.56 | 11.45 |
| 564 | 179.53 | 48.64 | 50.86 | 5.47 | 62.79 | 13.73 |
| 569 | 185.21 | 45.09 | 54.58 | 5.06 | 68.48 | 15.50 |
| 579 | 188.40 | 39.55 | 57.49 | 6.77 | 71.59 | 17.42 |
| 594 | 186.95 | 36.88 | 64.01 | 6.26 | 79.22 | 19.19 |
| 609 | 182.19 | 34.06 | 67.25 | 7.14 | 81.54 | 19.13 |
| 610.5 | 3.17 | 0.21 | 4.82 | 0.24 | 7.33 | 0.18 |
| 611 | 3.04 | 0.17 | 4.77 | 0.24 | 7.29 | 0.21 |

The results are in agreement with the rheological behavior and thixotropy study. In addition, the order of magnitude of the viscosity at 1 s−1 is the same as that observed previously. As a non-thixotropic hydrogel, the viscosity of Composition A plateaued at its initial value almost instantaneously during periods of rest, leading to a constant viscosity throughout the ten simulated blink cycles. In contrast, as thixotropic hydrogels, the viscosities of compositions B and C recovered without reaching the initial plateau during the rest intervals. This delay resulted in a slight loss of viscosity with each blink. Thus, after two cycles, compositions B and C exhibit lower viscosities than composition A, which was the least viscous composition originally.

Oscillatory Measurements

This test measures the storage (G') and loss (G") moduli during the rest intervals. The tan δ parameter was used to assess the gel state of the compositions. With each simulated blink, tan δ reached a maximum, due to the partial destructuring of the three-dimensional network of the gel, then recovered during the rest periods. The results are shown in Table 9.

TABLE 9

| | Composition A (Tan delta) | | Composition B (tan delta) | | Composition C (tan delta) | |
|---|---|---|---|---|---|---|
| Time (s) | Mean | SD | Mean | SD | Mean | SD |
| 5 | 0.41 | 0.01 | 0.64 | 0.09 | 1.46 | 0.00 |
| 10 | 0.29 | 0.03 | 0.51 | 0.12 | 0.88 | 0.03 |
| 15 | 0.21 | 0.07 | 0.48 | 0.11 | 0.71 | 0.06 |
| 20 | 0.18 | 0.08 | 0.44 | 0.15 | 0.63 | 0.11 |
| 30 | 0.13 | 0.12 | 0.36 | 0.27 | 0.56 | 0.23 |
| 45 | 0.11 | 0.24 | 0.27 | 0.52 | 0.50 | 0.36 |
| 60 | 0.10 | 0.32 | 0.24 | 0.91 | 0.43 | 0.45 |
| 66 | 0.54 | 0.05 | 1.27 | 0.05 | 2.49 | 0.00 |
| 71 | 0.33 | 0.02 | 0.66 | 0.02 | 1.40 | 0.01 |
| 76 | 0.30 | 0.02 | 0.58 | 0.03 | 1.14 | 0.02 |
| 81 | 0.27 | 0.02 | 0.55 | 0.04 | 1.01 | 0.02 |
| 91 | 0.21 | 0.04 | 0.52 | 0.07 | 0.85 | 0.05 |
| 106 | 0.15 | 0.07 | 0.47 | 0.16 | 0.75 | 0.08 |
| 121 | 0.13 | 0.11 | 0.42 | 0.30 | 0.70 | 0.12 |
| 127 | 0.45 | 0.02 | 0.99 | 0.02 | 2.30 | 0.00 |
| 132 | 0.31 | 0.01 | 0.71 | 0.02 | 1.73 | 0.00 |
| 137 | 0.28 | 0.01 | 0.61 | 0.03 | 1.47 | 0.00 |

TABLE 9-continued

| Time (s) | Composition A (Tan delta) | | Composition B (tan delta) | | Composition C (tan delta) | |
|---|---|---|---|---|---|---|
| | Mean | SD | Mean | SD | Mean | SD |
| 142 | 0.26 | 0.01 | 0.57 | 0.03 | 1.35 | 0.00 |
| 152 | 0.23 | 0.01 | 0.52 | 0.04 | 1.18 | 0.01 |
| 167 | 0.18 | 0.02 | 0.49 | 0.05 | 1.01 | 0.01 |
| 182 | 0.15 | 0.03 | 0.46 | 0.08 | 0.90 | 0.02 |
| 188 | 0.48 | 0.04 | 1.07 | 0.01 | 1.76 | 0.02 |
| 193 | 0.29 | 0.02 | 0.76 | 0.02 | 1.49 | 0.01 |
| 198 | 0.27 | 0.02 | 0.66 | 0.03 | 1.36 | 0.01 |
| 203 | 0.25 | 0.03 | 0.60 | 0.03 | 1.32 | 0.01 |
| 213 | 0.22 | 0.04 | 0.54 | 0.04 | 1.20 | 0.01 |
| 228 | 0.19 | 0.05 | 0.50 | 0.05 | 1.09 | 0.01 |
| 243 | 0.17 | 0.07 | 0.47 | 0.06 | 1.01 | 0.01 |
| 249 | 0.41 | 0.02 | 1.03 | 0.02 | 2.04 | 0.00 |
| 254 | 0.29 | 0.03 | 0.74 | 0.02 | 1.50 | 0.00 |
| 259 | 0.26 | 0.02 | 0.64 | 0.02 | 1.46 | 0.00 |
| 264 | 0.24 | 0.02 | 0.60 | 0.03 | 1.36 | 0.00 |
| 274 | 0.22 | 0.03 | 0.55 | 0.04 | 1.25 | 0.00 |
| 289 | 0.20 | 0.04 | 0.50 | 0.05 | 1.14 | 0.01 |
| 304 | 0.18 | 0.04 | 0.47 | 0.05 | 1.06 | 0.01 |
| 310 | 0.41 | 0.01 | 1.01 | 0.02 | 1.67 | 0.01 |
| 315 | 0.30 | 0.02 | 0.72 | 0.02 | 1.61 | 0.00 |
| 320 | 0.27 | 0.02 | 0.64 | 0.03 | 1.53 | 0.00 |
| 325 | 0.24 | 0.02 | 0.58 | 0.03 | 1.44 | 0.00 |
| 335 | 0.22 | 0.03 | 0.53 | 0.04 | 1.32 | 0.00 |
| 350 | 0.20 | 0.04 | 0.48 | 0.05 | 1.20 | 0.00 |
| 365 | 0.18 | 0.05 | 0.45 | 0.06 | 1.13 | 0.00 |
| 371 | 0.41 | 0.01 | 1.04 | 0.02 | 2.29 | 0.00 |
| 376 | 0.32 | 0.03 | 0.74 | 0.02 | 1.81 | 0.00 |
| 381 | 0.27 | 0.03 | 0.65 | 0.03 | 1.59 | 0.00 |
| 386 | 0.25 | 0.03 | 0.59 | 0.03 | 1.53 | 0.00 |
| 396 | 0.23 | 0.04 | 0.54 | 0.05 | 1.38 | 0.00 |
| 411 | 0.21 | 0.05 | 0.49 | 0.06 | 1.26 | 0.00 |
| 426 | 0.20 | 0.06 | 0.46 | 0.07 | 1.20 | 0.00 |
| 432 | 0.40 | 0.01 | 1.00 | 0.02 | 2.78 | 0.00 |
| 437 | 0.31 | 0.01 | 0.73 | 0.03 | 2.14 | 0.00 |
| 442 | 0.27 | 0.02 | 0.63 | 0.04 | 1.86 | 0.00 |
| 447 | 0.25 | 0.02 | 0.58 | 0.04 | 1.60 | 0.00 |
| 457 | 0.22 | 0.03 | 0.51 | 0.06 | 1.35 | 0.00 |
| 472 | 0.21 | 0.04 | 0.47 | 0.08 | 1.24 | 0.01 |
| 487 | 0.19 | 0.06 | 0.44 | 0.09 | 1.18 | 0.01 |
| 493 | 0.39 | 0.01 | 1.02 | 0.01 | 2.00 | 0.01 |
| 498 | 0.30 | 0.02 | 0.71 | 0.02 | 1.87 | 0.01 |
| 503 | 0.26 | 0.02 | 0.60 | 0.03 | 1.83 | 0.01 |
| 508 | 0.24 | 0.02 | 0.56 | 0.03 | 1.66 | 0.01 |
| 518 | 0.22 | 0.03 | 0.51 | 0.05 | 1.57 | 0.01 |
| 533 | 0.21 | 0.03 | 0.48 | 0.06 | 1.53 | 0.01 |
| 548 | 0.20 | 0.03 | 0.45 | 0.07 | 1.40 | 0.01 |

Composition A exhibits a tan δ<1 throughout the ten cycles. Thus, the gel network resists the high shear of the simulated blink and Composition A remains in the gel state.

Composition B also remains in the gel state throughout the ten cycles, except when the shear rate is high.

Composition C exhibits a tan δ<1 during the rest period of the first two cycles and is subsequently destructured.

III. In Vitro Study Aimed at Demonstrating the Mucoadhesion of Compositions According to the Invention Tensile Strength Test The maximum hydrogel detachment forces (F max) were measured and compared in the presence and in the absence of a mucin film. The results relating to the detachment force are shown in Table 10.

When comparing the values of F max in the presence of mucin to those without mucin, expressed here by F max, a significant increase was observed for all the compositions according to the invention (p<0.001).

This indicates a positive interaction between hydrogels and mucin. Therefore, hydrogels could be retained by interacting with mucins associated with the ocular surface, which would increase ocular retention time.

The studies and results presented in points I, II and III show that all the compositions according to the invention exhibit physicochemical properties suitable for ophthalmic use. Appropriate viscosities and in situ gelation capacities have been demonstrated, as well as shear thinning behavior favorable to ocular administration with regard to patient comfort. The optional addition of HEC makes it possible to improve the viscosity while reducing the resistance of the gels to shear stress. In addition, HEC enhanced the mucoadhesive properties of the compositions. Then, the ocular residence time was evaluated in vivo, which allowed a better understanding of the importance of each parameter. Indeed, the ocular residence time results from the combination of the effects of all the parameters evaluated individually in vitro.

The compositions according to the invention therefore exhibit numerous advantages in comparison with the eye drops of the prior art, in particular as regards their capacity to increase the residence time on the ocular surface for more than 3 hours, and therefore their bioavailability. This increased bioavailability leads to better efficacy of the treatment while allowing a reduction in the frequency of administration and therefore in the quantity of drug administered. In addition, the compositions according to the invention exhibit reduced side effects with reduced absorption at the systemic level.

IV. In Vitro Studies Studying the Release of Active Molecules at the Origin of the Mydriatic Effect, Using Methods with or without Membrane Different in vitro release studies of ophthalmic semi-solid galenic forms have been carried out using different devices.

All drug release experiments were performed using a USP 4 (through-cell) apparatus (USP-NF, 2013) with two cell models: the standard cell without membrane and an adapter for semi-solid forms with membrane. This study was performed to investigate the in vitro release profiles of compositions A, B and C and the influence of HEC on the release mechanisms. STF (pH 7.4) was used as the dissolution medium.

Evaluation of Drug Release In Vitro Using Standard Cells

To mimic the aqueous environment of the ocular surface, six standard cells with a diameter of 22.6 mm were used in all experiments. Operating in a closed configuration, an automated system was connected to a peristaltic pump. The dissolution media were sampled manually and analyzed by HPLC-UV. In each cell, a 5 mm diameter ruby bead and 1 mm diameter glass beads were placed at the base of the flow cells to ensure laminar flow. About 300 µL of hydrogel was placed in the bed of glass beads. During the test, 150 mL of STF was circulated into each cell at flow rates of 3, 8 and 15 mL/min. A temperature of 35±0.5° C. was maintained

TABLE 10

| | A + STF | | B + STF | | C + STF | | A + STF + Mucins | | B + STF + Mucins | | C + STF + Mucins | |
|---|---|---|---|---|---|---|---|---|---|---|---|---|
| | Mean | SD | Mean | SD | Mean | SD | Mean | SD | Mean | SD | Mean | SD |
| F (N) | 3.30 | 0.46 | 4.64 | 0.57 | 5.42 | 0.60 | 6.99 | 0.83 | 8.87 | 1.29 | 10.74 | 1.15 | throughout the study. An aqueous solution of 5% PHE and 0.5% TPC was also tested and used as a reference. Results are the mean±SD of n=6 experiments. Drug release profiles obtained with the closed configuration, i.e. cumulative percent drug release (Mt/M1, %) versus time (t, min), were plotted.

Evaluation of Drug Release In Vitro Using the Semi-Solid Adapter

To assess the diffusion profiles of PHE and TPC from hydrogels, an adapter for semi-solid forms ("USP 36-NF 31: (1724)) semi-solid pharmaceuticals-performance tests," 2013) was used. The adapter was designed for use with the 22.6 mm cell of the USP 4 device.

The adapter consists of two basic components: a reservoir in which the product is introduced and a ring in which the membrane is held. 1200 µL of hydrogel was placed in the reservoir and the ring, once fitted with a cellulose acetate membrane (0.45 µm), was screwed onto the reservoir with a specific tool. The adapter was then slipped into the cylindrical part of the cell with the membrane facing down. A closed system was also applied. The flow rate was set at 15 mL/min. The testing procedure was the same as described previously in the standard cell. The release of active agents from semi-solid forms is a complex phenomenon. Two main mechanisms are generally involved. The release can be governed either by Fickian diffusion (case 1) or by relaxation/erosion of the system (transport case II). In many cases both mechanisms are involved and the release is therefore called abnormal.

The Peppas-Sahlin model was used to quantify the contribution of diffusion and erosion to the release of active ingredients from an in situ gelling delivery system. The Peppas-Sahlin equation can be transformed. The diffusion percentages and erosion percentages at time t were obtained by Zeng's equations, assuming a value of 0.5 for the geometry of the system. The similarity factor f2, a model-independent method, was calculated for the pairwise comparison of all release profiles. First, a comparison of the release performance between PHE and TPC was done. Then, comparisons between compositions A, B and C were done at each flow rate.

In addition, the 25%, 50% and 80% release times (T25, T50 and T80, respectively) were calculated from the Peppas-Sahlin equation.

The results obtained without semi-solid adapters are presented in Tables 11 (3 mL), 12 (8 mL) and 13 (15 mL).

TABLE 11

| 3 mL/min | PHE Composition A | | PHE Composition B | | PHE Composition C | | PHE Ctrl | |
|---|---|---|---|---|---|---|---|---|
| Time (min) | Mean | SD | Mean | SD | Mean | SD | Mean | SD |
| 0 | 0 | 0 | 0 | 0 | 0 | 0 | 0 | 0 |
| 10 | 30.78 | 2.16 | 29.95 | 1.43 | 30.68 | 1.28 | 94.09 | 1.28 |
| 20 | 41.48 | 3.4 | 40.81 | 0.73 | 41.6 | 1.99 | 99.01 | 1.99 |
| 30 | 50.05 | 3.88 | 48.51 | 2.37 | 50.06 | 3.08 | 100 | 3.08 |
| 45 | 58.75 | 4.16 | 57.75 | 1.97 | 58.12 | 3.25 | 100 | 3.25 |
| 60 | 66.02 | 4.11 | 65.13 | 1.95 | 65.38 | 2.35 | | |
| 120 | 82.05 | 3.62 | 82.18 | 1.38 | 83.69 | 2.04 | | |
| 180 | 90.18 | 3.43 | 90.54 | 2.43 | 91.31 | 3.08 | | |
| 240 | 95.15 | 3.75 | 95.31 | 1.73 | 94.29 | 1.98 | | |
| 300 | 98.56 | 1.15 | 97.81 | 1.92 | 99.38 | 0.63 | | |
| 360 | 100 | 0 | 100 | 0 | 100 | 0 | | |

| | TPC Composition A | | TPC Composition B | | TPC Composition C | | TPC Ctrl | |
|---|---|---|---|---|---|---|---|---|
| Time (min) | Mean | SD | Mean | SD | Mean | SD | Mean | SD |
| 0 | 0 | 0 | 0 | 0 | 0 | 0 | 0 | 0 |
| 10 | 24.4 | 4.5 | 23.37 | 3.19 | 23.83 | 3.64 | 93.58 | 3.64 |
| 20 | 34.48 | 5.14 | 33.99 | 2.65 | 33.73 | 4.05 | 98.24 | 4.05 |
| 30 | 42.5 | 4.96 | 41.08 | 3.53 | 41.8 | 4.45 | 100 | 4.45 |
| 45 | 51.47 | 6.1 | 49.94 | 2.04 | 50.11 | 4.32 | 100 | 4.32 |
| 60 | 59.33 | 6.11 | 57.04 | 2.07 | 56.78 | 3.69 | | |
| 120 | 76.81 | 3.99 | 76.38 | 2.05 | 77.56 | 3.32 | | |
| 180 | 85.98 | 4.09 | 86.65 | 2.65 | 87.33 | 3.51 | | |
| 240 | 93.35 | 4.69 | 92.87 | 2.13 | 92.6 | 2.01 | | |
| 300 | 97.83 | 2.67 | 97.18 | 1.78 | 98.43 | 1.2 | | |
| 360 | 100 | 0 | 100 | 0 | 100 | 0 | | |

TABLE 12

| 8 mL/min | PHE Composition A | | PHE Composition B | | PHE Composition C | | PHE Ctrl | |
|---|---|---|---|---|---|---|---|---|
| Time (min) | Mean | SD | Mean | SD | Mean | SD | Mean | SD |
| 0 | 0 | 0 | 0 | 0 | 0 | 0 | 0 | 0 |
| 10 | 38.06 | 3.18 | 35.76 | 2.31 | 31.96 | 0.81 | 100.36 | 0.81 |
| 20 | 50.5 | 4.39 | 46.17 | 3.15 | 42.62 | 1.43 | 99.53 | 1.43 |
| 30 | 60.43 | 6.38 | 54.25 | 2.7 | 50.9 | 1.62 | 100 | 1.62 |
| 45 | 71.78 | 8.53 | 64.27 | 3.38 | 61.28 | 1.14 | 100 | 1.14 |
| 60 | 78.7 | 7.48 | 71.35 | 5.16 | 66.85 | 1.45 | | |
| 120 | 94.84 | 5.85 | 90.84 | 6.27 | 84.15 | 2.3 | | |
| 180 | 99.17 | 2.7 | 96.31 | 3.35 | 92.63 | 3.54 | | |
| 240 | 99.81 | 8.24 | 98.07 | 2.4 | 95.42 | 2.24 | | |

TABLE 12-continued

| Time (min) | 300 | 360 |
|---|---|---|
| | 99.74 | 100 |
| | 1 | 0 |
| | 98.2 | 100 |
| | 3.4 | 0 |
| | 98.69 | 100 |
| | 2.24 | 0 |

| Time (min) | TPC Composition A | | TPC Composition B | | TPC Composition C | | TPC Ctrl | |
|---|---|---|---|---|---|---|---|---|
| | Mean | SD | Mean | SD | Mean | SD | Mean | SD |
| 0 | 0 | 0 | 0 | 0 | 0 | 0 | 0 | 0 |
| 10 | 33.63 | 4.01 | 31.13 | 4.46 | 27.84 | 5.4 | 100.17 | 2.36 |
| 20 | 45.21 | 4.31 | 41 | 3.86 | 37.33 | 3.51 | 99.48 | 3.51 |
| 30 | 54.8 | 6.65 | 48.47 | 4.01 | 44.65 | 3.28 | 100 | 3.28 |
| 45 | 66.63 | 9.52 | 57.67 | 3.89 | 54.64 | 2.91 | 100 | 2.91 |
| 60 | 74.73 | 11.5 | 65.28 | 5.47 | 60.48 | 3.21 | | |
| 120 | 92.92 | 6.61 | 86.92 | 8.01 | 79.19 | 4.11 | | |
| 180 | 97.53 | 3.71 | 93.52 | 4.98 | 88.74 | 4.17 | | |
| 240 | 99.46 | 7.3 | 97.15 | 2.63 | 93.93 | 2.76 | | |
| 300 | 99.2 | 4.09 | 97.22 | 3.21 | 98.38 | 1.94 | | |
| 360 | 100 | 0 | 100 | 0 | 100 | 0 | | |

TABLE 13

| 15 mL/mn | PHE Composition A | | PHE Composition B | | PHE Composition C | | PHE Ctrl | |
|---|---|---|---|---|---|---|---|---|
| Time (min) | Mean | SD | Mean | SD | Mean | SD | Mean | SD |
| 0 | 0 | 0 | 0 | 0 | 0 | 0 | 0 | 0 |
| 2 | 13.08 | 2.48 | 11.96 | 2.68 | 12.3 | 0.86 | 100.15 | 0.8 |
| 4 | 26.6 | 4.87 | 21.06 | 4.18 | 19.78 | 0.93 | 100.34 | 0.85 |
| 6 | 35.14 | 7.29 | 28.87 | 6.33 | 25.13 | 0.59 | 100 | 1.19 |
| 8 | 42.98 | 11.57 | 35.72 | 5.97 | 28.86 | 0.64 | | |
| 10 | 49.23 | 17.68 | 43.24 | 9.22 | 31.94 | 0.8 | | |
| 15 | 63.52 | 12.75 | 58.41 | 13.64 | 37.74 | 0.76 | | |
| 20 | 73.89 | 13.94 | 70.94 | 23.32 | 42.63 | 0.85 | | |
| 30 | 86.56 | 8.95 | 80.12 | 20.88 | 50.88 | 1.19 | | |
| 45 | 92.78 | 2.58 | 86.65 | 11.74 | 60.93 | 0.53 | | |
| 60 | 97.08 | 3.93 | 92.66 | 5.21 | 66.35 | 0.78 | | |
| 120 | 102.19 | 5.9 | 101.21 | 1.45 | 83.91 | 0.9 | | |
| 180 | 101.1 | 2.83 | 99.89 | 0.79 | 92.46 | 2.6 | | |
| 240 | 99.25 | 2.32 | 100.72 | 1.62 | 96.42 | 2.01 | | |
| 300 | 99.23 | 2.01 | 99.33 | 1.52 | 98.89 | 2.34 | | |
| 360 | 100 | 0 | 100 | 0 | 100 | 0 | | |

| | TPC Composition A | | TPC Composition B | | TPC Composition C | | TPC Ctrl | |
|---|---|---|---|---|---|---|---|---|
| Time (min) | Mean | SD | Mean | SD | Mean | SD | Mean | SD |
| 0 | 0 | 0 | 0 | 0 | 0 | 0 | 0 | 0 |
| 2 | 12.53 | 2.11 | 10.04 | 3.64 | 10.65 | 2.17 | 100.71 | 0.8 |
| 4 | 24.51 | 5.27 | 19.26 | 8.79 | 16.91 | 3.48 | 101.29 | 0.85 |
| 6 | 32.97 | 8.32 | 27.02 | 13.61 | 20.88 | 6.03 | 100 | 1.19 |
| 8 | 41.11 | 7.54 | 33.76 | 12.39 | 24.78 | 5.26 | | |
| 10 | 47.26 | 15.31 | 40.66 | 15.37 | 27.84 | 8.27 | | |
| 15 | 61.21 | 9.88 | 56.03 | 20.51 | 33.19 | 6.42 | | |
| 20 | 71.88 | 11.92 | 67.18 | 28.36 | 37.33 | 7.2 | | |
| 30 | 84.86 | 7.73 | 77.48 | 25.87 | 44.7 | 5.58 | | |
| 45 | 91.82 | 2.97 | 84.06 | 15.9 | 54.59 | 4.73 | | |
| 60 | 97.1 | 3.58 | 91.67 | 7.94 | 60.41 | 3.99 | | |
| 120 | 102.33 | 5.92 | 101.23 | 2.94 | 79.24 | 3.84 | | |
| 180 | 101.04 | 2.83 | 100.67 | 2.33 | 88.69 | 4 | | |
| 240 | 98.96 | 3.26 | 101.99 | 3.07 | 93.79 | 2.14 | | |
| 300 | 99.64 | 2.33 | 99.84 | 2.2 | 98.33 | 1.73 | | |
| 360 | 100 | 0 | 100 | 0 | 100 | 0 | | |

The above results showed that, in standard dissolution cells, on USP 4 devices approved by the FDA, the in situ gelling delivery systems exhibited rapid but sustained release over time. All control solutions (CTRL) released more than 80% of the drugs within 10 minutes, while the 80% release time (T80) of compositions A, B and C was reached between 30 and 180 minutes depending on of flow. The prolonged release of the drug over time can be explained by two phenomena. Either the release of the drug from the matrix is due to diffusion, or the release of the drug is the result of erosion of this matrix. A slight initial release was observed, which is an asset for the rapid induction of mydriasis expected after administration.

To compare release profiles, the FDA recommends a model-independent approach. The aim is to study the similarity factor f2, which makes it possible to compare profiles easily. A value of 100 for the factor f2 means that the two compared profiles are completely identical, and a value of 50 corresponds to a difference of 10% at all points in time. Thus, two profiles are considered to be similar (i.e. less than 10% difference) if the value of f2 is between 50 and 100. The values of f2 obtained by comparing the PHE and TPC release profiles of compositions A, B and C at three different flow rates are summarized in Table 14 (Similarity factor f2: pairwise comparison of the release profiles of active agents at flow rates of 3, 8 and 15 mL/min, Intra-composition comparison of PHE and TPC release profiles, inter-composition comparison of PHE release profiles and inter-composition comparison of TPC release profiles).

TABLE 14

| Drug release profile | Composition | f2 values (3 mL/min) | f2 values (8 mL/min) | f2 values (15 mL/min) |
|---|---|---|---|---|
| PHE; TPC | PHE A; TPC A | 60 | 66.8 | 84.4 |
|  | PHE B; TPC B | 58.7 | 63.8 | 80.0 |
|  | PHE C; TPC C | 57.2 | 63.4 | 68.9 |
| PHE; PHE | PHE A; PHE B | 93.9 | 63.2 | 64.1 |
|  | PHE A; PHE C | 95.6 | 48.9 | 35.0 |
|  | PHE B; PHE C | 93.3 | 72.8 | 39.9 |
| TPC; TPC | TPC A; TPC B | 89.7 | 59.9 | 62.7 |
|  | TPC A; TPC C | 90.2 | 49.4 | 32.6 |
|  | TPC B; TPC C | 96.9 | 72.3 | 37.7 |

The times for 25, 50 and 80% of the total amount released were also calculated from the Peppas-Sahlin model equation and the mean values are shown in Table 15. For all the compositions according to the invention, the increase in the flow rate resulted in the reduction of T25, T50 and T80.

TABLE 15

| Flow rate | F | Active ingredient | $T_{25}$ (min) | $T_{50}$ (min) | $T_{80}$ (min) |
|---|---|---|---|---|---|
| 3 mL/min | A | PHE | 6.5 | 30.3 | 102.1 |
|  |  | TPC | 10.4 | 42.3 | 110.6 |
|  | B | PHE | 6.9 | 31.9 | 103.9 |
|  |  | TPC | 10.9 | 45.3 | 121.4 |
|  | C | PHE | 6.4 | 30.6 | 108.6 |
|  |  | TPC | 10.6 | 45.2 | 125.3 |
| 8 mL/min | A | PHE | 4.2 | 19.1 | 60.2 |
|  |  | TPC | 5.6 | 24.2 | 68.8 |
|  | B | PHE | 4.8 | 23.6 | 94.7 |
|  |  | TPC | 6.4 | 31.7 | 125.7 |
|  | C | PHE | 6.2 | 28.2 | 89.9 |
|  |  | TPC | 8.4 | 37.4 | 113.5 |
| 15 mL/min | A | PHE | 3.1 | 10.9 | 24.5 |
|  |  | TPC | 3.5 | 11.8 | 25.5 |
|  | B | PHE | 4.3 | 13.3 | 27.2 |
|  |  | TPC | 4.9 | 14.4 | 28.7 |
|  | C | PHE | 6.2 | 28.4 | 89.2 |
|  |  | TPC | 8.6 | 34.7 | 108.9 |

V. Tolerance and Cytotoxicity Study on Human Corneal Cells, HCE Line Cytotoxicity Assay in Human Corneal Epithelial Cells A human corneal epithelial (HCE) cell line was cultured in Dulbecco's essential medium (Eurobio, Les Ulis, France) supplemented with 10% fetal calf serum (Eurobio), 1% glutamine (Eurobio) and 1% penicillin and streptomycin (Eurobio). Cultures were maintained at 37° C. in 5% $CO_2$ in a humidified incubator.

All wells were seeded with the same number of cells ($9 \times 10^4$ cells/mL solution). After 24 hours, the cells reached about 70% to 80% confluency. The cells were washed with PBS and incubated for 30 minutes with 100 µL of gels in situ. White gels (compositions A, B and C without active ingredients), 5% PHE and 0.5% TPC control solution, 1.29% NaCl control solution (exhibiting the same osmolarity as the in situ gels) and commercially available eye drops (sterile unit doses of 0.5% Mydriaticum® and 10% Neosynephrine®) were used as controls. The cells were then washed with PBS. A neutral red test was performed immediately after incubation and after 24 hours of recovery in the culture medium. The experiments were performed in triplicate.

The neutral red test (Fluka, Buchs, Switzerland) is a cell viability test based on the ability of viable cells to incorporate neutral red, which is a weak cationic dye that readily penetrates cell membranes by nonionic diffusion and accumulates in lysosomes. It binds to anionic sites in the lysosomal matrix. The integrity of the lysosomal membrane is closely related to cell viability and is assessed by neutral red fluorescence (excitation at 535 nm; emission at 600 nm) [30]. After 3 hours of incubation at 37° C., the cells were washed with PBS and incubated with 200 µL per well of neutral red solution (50 µg/mL), according to the protocol validated by Borenfreund and Puerner. After 3 hours of incubation at 37° C. in a humid atmosphere with 5% $CO_2$, the wells were washed with PBS to remove any remaining unincorporated dye. The dye was then released from the cells using 200 µL of lysis solution per well (1% acetic acid, 50% ethanol and 49% $H_2O$), then the fluorescence was measured using a fluorometer for microplates (Safire; Tecan, Lyon, France).

The results of the cytotoxicity test are shown in Table 16.

TABLE 16

|  | Composition A | | Composition B | | Composition C | | NaCl 1.29% | | Ctrl | |
|---|---|---|---|---|---|---|---|---|---|---|
|  | Mean | SD | Mean | SD | Mean | SD | Mean | SD | Mean | SD |
| % Viability (Direct reading) | 19.67 | 13.33 | 19.00 | 7.67 | 19.67 | 14.00 | 98.67 | 6.00 | 17.67 | 13.00 |
| % Viability (Indirect reading) | 11.33 | 15.33 | 11.00 | 11.67 | 12.00 | 14.33 | 95.67 | 4.67 | 10.33 | 12.33 |

|  | Composition A' | | Composition B' | | Composition C' | | Mydriaticum 0.5% | | Neosynephrine 10% | |
|---|---|---|---|---|---|---|---|---|---|---|
|  | Mean | SD | Mean | SD | Mean | SD | Mean | SD | Mean | SD |
| % Viability (Direct reading) | 104.33 | 7.33 | 120.67 | 7.00 | 121.00 | 7.33 | 39.33 | 16.00 | 16.67 | 7.67 |
| % Viability (Indirect reading) | 99.67 | 8.33 | 112.33 | 8.67 | 113.00 | 8.33 | 23.33 | 15.00 | 12.33 | 17.33 |

First, the compositions according to the invention induce a significant reduction in viability when they are applied to HCE cells ($p<0.001$), without recovery after 24 hours. For the 1.29% NaCl control solution, which exhibited an osmolarity value of 430 mOsm/L, no impact on cell viability was observed (viability of 98.7±6.0%). Therefore, the relatively high osmolarity of compositions A, B and C was not considered to be the parameter inducing toxicity.

Then, a control solution containing 5% PHE and 0.5% TPC was tested. A significant decrease in viability was observed ($p<0.001$), similar to those observed for compositions A, B and C ($p>0.05$). In addition, commercially available PHE (Neosynephrine® 10%) and TPC (Mydriaticum® 0.5%) eye drops were tested individually. Again, Neosynephrine® 10% induced a significant reduction in viability with values similar to those of compositions A, B and C ($p>0.05$). Mydriaticum® 0.5% induced a smaller decrease in cell viability, but this was still not greater than 39.3±16.1%. Therefore, the apparent toxicity exhibited by compositions A, B and C should be due to the toxicity induced mainly by PHE, but also by TPC.

Finally, the integrity of the ocular cell membrane was not altered by the in situ gel compositions without PHE and TPC (Compositions A', B' and C') and remained greater than 100%. The neutral red assay showed no significant difference in viability after exposure to compositions A', B' and C' and to untreated cells ($p>0.05$). Consequently, the developed administration systems did not induce toxicity, which was due to the active ingredients. Nevertheless, the FDA and EMA, among others, have widely used and approved the use of PHE and TPC. In addition, PHE and TPC are used as a one-time mydriatic treatment and are not intended for chronic ocular administration. Thus, the toxicity of the developed compositions was not greater than that of commercially available eye drops. Additionally, ocular toxicity might be reduced due to the lower amount of PHE and TPC that might be required to induce effective mydriasis using in situ gelling delivery systems.

VI. In Vivo Imaging Study of the Effectiveness of the Compositions According to the Invention on the Dilation of the Pupil and on the Persistence at the Administration Site.

The in vivo experiments were carried out in non-anesthetized rabbits kept in containment boxes. However, their heads were free to move, so normal eyelid and eye movements were allowed during the experiments.

One drop of preparation was carefully administered into the conjunctival sac of the animal using a plastic Pasteur pipette. The contralateral eye was not treated and was used as a control. The volume of the drops of different compositions as well as of the control solution was measured and no significant variation was observed (from 28.6±0.8 µL to 30.1±1.2 µL). A flexible slider was placed on the rabbit's cheek and images of both eyes were recorded using a Canon EOS 350D equipped with a Canon EF 100 mm f/2.8 macro lens providing zoom and autofocus allowing the eye region to be captured with great precision and then making it possible to focus on the regions of interest. The rabbits were placed under surgical lighting (Halux LED 20 P SX, Derungs medical lighting) in order to maintain constant illumination of the eye and to avoid physiological variations in mydriasis. The acquisitions were done before administration (reference image) and up to five hours after administration of the composition.

The compositions according to the invention A, B and C were compared with a control solution (CTRL) (5% phenylephrine and 0.5% tropicamide, in sterile water) and with commercially available eye drops (CED): Mydryaticum® (tropicamide 0.5%) and Neosynephrine® (phenylephrine hydrochloride 10%). In the case of commercially available eye drops, a standard protocol used clinically was followed: 4 drops of each eye drop, spaced five minutes apart, were instilled from t0 to 35 minutes. The kinetic data of the mydriasis were finally obtained by analyzing the images using the Image J open source image processing software. Pupil diameters were measured and diameters minus the reference diameter were plotted against time to express pupil dilation. The area under curve (AUC) was calculated. The results are the mean±standard deviation of n=3 experiments performed on three different rabbits. Each rabbit had a minimum wash period of 48 hours between two experiments.

At the end of the protocol, the rabbits were placed in foster care by an approved association; no sacrifice was necessary.

Effective mydriasis is defined by an increase of 5 mm or more in the diameter of the pupil from the reference diameter (t0) and by the absence of a pupil reflex.

Compositions A, B and C provide effective mydriasis in less than 10 minutes and maintain sufficient expansion for more than 3 hours. On the contrary, the control solution achieved effective mydriasis in about 20 minutes and maintained a sufficient effect for less than an hour. It is important to note that a drop of the compositions developed according to the invention contains the same amount of PHE and TPC as a drop of control solution. Therefore, the same amount of PHE and TPC was instilled.

The area under the curves was calculated and a significant difference was observed between compositions A, B and C compared to the control solution, demonstrating the direct effect of the gelling compositions in situ on the bioavailability (Table 17). This significant increase in pupil dilation could be explained by the prolonged residence time and sustained drug release previously evaluated for the developed in situ gelling delivery systems.

TABLE 17

| Composition | $AUC_{0-300\ min}$ (mm min) |
|---|---|
| A | 1781.6 ± 121.7 |
| B | 1618.8 ± 151.8 |
| C | 1586.2 ± 120.9 |
| CTRL | 1080.5 ± 169.1 |
| CED | 1690.6 ± 97.6 |

The results on the residence time in vivo (Table 18) and the mydriasis in vivo (Table 19) are presented below.

TABLE 18

| time | Fluorescence intensity | | | | | | | |
|---|---|---|---|---|---|---|---|---|
| | Composition A | | Composition B | | Composition C | | Ctrl | |
| (min) | Mean | SD | Mean | SD | Mean | SD | Mean | SD |
| 1 | 62.8697539 | 34.84038 | 33.9132115 | 11.30775 | 45.0626211 | 20.8656165 | 10.3962752 | 1.74499811 |
| 5 | 51.810841 | 31.43531 | 21.8863686 | 2.930091 | 35.0690954 | 11.5005264 | 1.40346266 | 1.11136365 |
| 10 | 50.149453 | 32.21445 | 25.0951385 | 1.61793 | 29.8503684 | 16.3190121 | 1.48590594 | 0.80562465 |
| 20 | 34.5570361 | 21.26413 | 26.2860681 | 0.46569 | 32.7929051 | 15.9938915 | 0.48819163 | 0.65095849 |
| 30 | 36.6428201 | 17.43211 | 25.8971432 | 8.024855 | 29.352218 | 8.26076914 | 0.73153247 | 0.47617501 |
| 60 | 31.5799921 | 11.88381 | 16.7488078 | 0.929205 | 24.5007674 | 12.4247003 | 0.70220789 | 0.33080955 |
| 120 | 25.1128953 | 8.453358 | 20.6344449 | 0.550663 | 21.2059506 | 12.5465744 | 1.34051212 | 1.12552796 |
| 180 | 27.5303625 | 12.37308 | 17.7455303 | 2.253933 | 18.7843575 | 11.9583957 | 0.69406134 | 0.30927919 |

TABLE 19

| | Increase in pupil diameter (mm) | | | | | | | | | |
|---|---|---|---|---|---|---|---|---|---|---|
| Time | Composition A | | Composition B | | Composition C | | Ctrl | | Commercially available eye drops | |
| (min) | Mean | SD | Mean | SD | Mean | SD | Mean | SD | Mean | SD |
| 0 | 0 | 0 | 0 | 0 | 0 | 0 | 0 | 0 | 0 | 0 |
| 10 | 5.686 | 0.496 | 4.924 | 0.318 | 6.527 | 0.721 | 4.344 | 0.230 | 3.689 | 1.118 |
| 20 | 6.426 | 0.636 | 6.277 | 0.450 | 6.891 | 0.395 | 5.174 | 0.502 | 6.401 | 0.425 |
| 30 | 7.100 | 0.475 | 6.698 | 0.150 | 7.003 | 0.464 | 5.157 | 0.324 | 6.732 | 0.858 |
| 60 | 7.109 | 0.242 | 6.710 | 0.437 | 7.232 | 0.651 | 5.441 | 0.653 | 7.397 | 0.317 |
| 120 | 6.352 | 0.638 | 6.017 | 0.551 | 5.480 | 0.384 | 4.192 | 0.514 | 6.284 | 0.374 |
| 180 | 6.010 | 0.628 | 5.699 | 1.019 | 4.801 | 0.467 | 3.022 | 1.250 | 5.612 | 0.454 |
| 300 | 4.609 | 0.298 | 3.283 | 0.516 | 3.760 | 0.612 | 1.896 | 0.842 | 4.002 | 0.106 |

With the administration of CED, effective mydriasis was achieved in approximately 20 minutes and was maintained for 3 hours. With the exception of the first 20 minutes when the intensity of mydriasis following CED administration was significantly lower than that of Compositions A, B and C, the intensity profiles of mydriasis were then comparable.

All the compositions according to the invention have allowed an effective mydriasis after the administration of a single drop. In addition, sufficient mydriasis was obtained faster than with the reference protocol. The intensity and duration of mydriasis induced by Compositions A, B and C were similar to those obtained after administration of CED.

Thus, the compositions according to the invention can be considered as promising alternatives to existing treatments. Effective mydriasis can be induced after instillation of a single drop of liquid, which gels upon administration to the ocular surface, increasing the residence time and sustained release of the drug, dramatically increasing bioavailability.

In addition, the amounts of PHE and TPC administered according to the CED protocol were 8 and 4 times greater, respectively. Nevertheless, the dilation of the pupil was slower to appear and did not last longer, which highlights the lower bioavailability and the higher rate of elimination of the active agents on the ocular surface after the administration of classic eye drops.

Therefore, the invention results in a decrease in the risk of side effects. On the one hand, local irritations to the ocular surface region could be reduced because the total amount of active ingredients required to induce mydriasis was smaller using the in situ gelling delivery systems developed over CED. PHE and TPC have shown significant cytotoxicity on human corneal epithelial cells. During the experiments, discomfort resulting in an increased blink frequency was observed after the administration of one drop of phenylephrine (Neosynephrine® 10%) (5 to 6 additional blinks within 30 seconds of administration). No increase in blinking frequency or discomfort was observed after administration of compositions A, B and C. This effect could be due to the high osmolarity (>900 mOsm/L) of phenylephrine eye drops. A tingling sensation has been reported on numerous occasions in humans after administration of these eye drops [44]. Patient comfort could therefore be improved by the use of in situ gelling delivery systems. On the other hand, the systemic side effects could be reduced due to the decreased elimination of the drug from the ocular surface potentially absorbed systemically. This is because the increased ocular residence time allowed PHE and TPC to be retained on the ocular surface region, which would lead to a greater amount of drug absorbed locally.

Comparative Tests with Other Gelling Polymers

Other gelling, viscosifying and/or mucoadhesive polymers such as poloxamers, carbomers, alginates or xanthan gum have been tested.

Poloxamers exhibit a gelation dependent on the concentration and on the temperature, which is not suitable for ocular applications according to the present invention because the dilution effect in the presence of tear fluid causes a great variability in the gelation temperature.

Alginates gel only in the presence of calcium ions. The calcium concentration in the tear fluid is too low to allow gelation suitable for the envisaged applications and the objectives of the present invention.

Xanthan gum causes gelation of preparations even before their use. This gelation is due in particular to the ionic interactions between the ionized phenylephrine and the negative charges of the xanthan gum chains.

Carbomers are pH-gelling polymers. They are in viscous liquid form at acidic pH and gel at neutral pH. Administration of an acidic solution to the eye is not optimal for patient tolerance and comfort.

The invention claimed is:

1. A composition in the form of a solution having a viscosity of less than or equal to 500 mPa·s at a temperature between 20° and 25° C., consisting of:
   gellan gum,
   phenylephrine or phenylephrine in combination with tropicamide,
   sodium citrate in an amount ranging from 0.01 to 0.2% w/v as a gelation regulating agent,
   a cellulose derivative in an amount 0 to 2% w/v;
   a chelating agent in an amount 0 to 0.2% w/v; and
   water;
   and
   wherein after the composition is applied to the eye, the composition has a gel viscosity at rest when the eye is open and a lower viscosity under the eyelid shear, thereby decreasing eye irritation and discomfort.

2. The composition of claim 1, wherein an amount of the gellan gum is at most 0.6%, the percentage being given by weight of gellan gum/volume of composition.

3. The composition of claim 1, wherein an amount of the gellan gum is from 0.05 to 0.25%, the percentage being given by weight of gellan gum/volume of composition.

4. The composition of claim 1, wherein an amount of phenylephrine is at least 0.1%, the percentage being given by weight of phenylephrine/volume of composition.

5. The composition of claim 1, wherein an amount of phenylephrine is from 0.1 to 10%, the percentage being given by weight of phenylephrine/volume of composition.

6. The composition of claim 1, wherein an amount of tropicamide is at least 0.1%, the percentage being given by weight of tropicamide/volume of composition.

7. The composition of claim 1, wherein an amount of tropicamide is 0.1 to 10%, the percentage being given by weight of tropicamide/volume of composition.

8. The composition of claim 1, wherein the cellulose derivative is selected from hydroxyethylcellulose and/or hydroxypropylmethylcellulose.

9. The composition of claim 1, wherein the composition is an ophthalmic product.

10. The composition of claim 1, wherein the composition gels when it is deposited on the surface of the eye under the effect of the mono and divalent cations contained in the tear fluid.

11. The composition of claim 1, wherein the composition is a mydriatic ophthalmic product.

12. The composition of claim 1, wherein the composition is a medicament for treatment of ocular pathologies.

13. The composition of claim 1, wherein the composition has a slightly acidic pH of at least 6.45 or higher.

14. The composition of claim 1, wherein the composition consists of:
   gelan gum in an amount from 0.05 to 0.6% w/v;
   phenylephrine;
   tropicamide;
   sodium citrate in an amount from 0.09 to 0.2% w/v;
   a cellulose derivative in an amount 0 to 2% w/v;
   a chelating agent in an amount 0 to 0.2% w/v; and
   water.

15. A method of treating a human subject or an animal, the method comprising administering the composition of claim 1 to the eye of the human subject or of the animal to induce mydriasis before an operation of said eye or before an examination of said eye.

16. The method of claim 15, wherein the composition is administered to induce mydriasis in less than 10 minutes.

17. The method of claim 15, wherein the composition is administered to induce mydriasis that lasts more than 120 minutes.

18. The method of claim 15, wherein at least one drop of the composition is administered in the eye.

19. The method of claim 15, wherein administering the composition to the eye treats uveal inflammation and/or keratitis.

* * * * *